(12) United States Patent
Cha et al.

(10) Patent No.: US 11,876,191 B2
(45) Date of Patent: Jan. 16, 2024

(54) METHOD FOR ACTIVATING SECONDARY BATTERY

(71) Applicant: LG CHEM, LTD., Seoul (KR)

(72) Inventors: In Young Cha, Daejeon (KR); Joon Sung Bae, Daejeon (KR); Sung Hoon Yu, Daejeon (KR); Seung Youn Choi, Daejeon (KR); Gyu Ok Hwang, Daejeon (KR)

(73) Assignee: LG ENERGY SOLUTION, LTD., Seoul (KR)

( * ) Notice: Subject to any disclaimer, the term of this patent is extended or adjusted under 35 U.S.C. 154(b) by 618 days.

(21) Appl. No.: 17/055,814

(22) PCT Filed: Nov. 15, 2019

(86) PCT No.: PCT/KR2019/015680
§ 371 (c)(1),
(2) Date: Nov. 16, 2020

(87) PCT Pub. No.: WO2020/105974
PCT Pub. Date: May 28, 2020

(65) Prior Publication Data
US 2021/0210802 A1    Jul. 8, 2021

(30) Foreign Application Priority Data
Nov. 20, 2018    (KR) .................. 10-2018-0143603

(51) Int. Cl.
*H01M 10/44*    (2006.01)
*H01M 10/04*    (2006.01)

(52) U.S. Cl.
CPC ......... *H01M 10/443* (2013.01); *H01M 10/04* (2013.01)

(58) Field of Classification Search
USPC ........................................... 320/127
See application file for complete search history.

(56) References Cited

U.S. PATENT DOCUMENTS 6,436,583 B1 *   8/2002   Mikhaylik .......... H01M 10/052
                                                  429/324
6,589,686 B2    7/2003   Ovshinsky et al.
(Continued)

FOREIGN PATENT DOCUMENTS

CN    1423362 A    6/2003
CN    1864329 A    11/2006
(Continued)

OTHER PUBLICATIONS

Korean Office Action for Korean Application No. 10-2018-0143603, dated Aug. 18, 2022, with English translation.
(Continued)

*Primary Examiner* — Mohammed Alam
(74) *Attorney, Agent, or Firm* — Birch, Stewart, Kolasch & Birch, LLP (57) ABSTRACT

The present invention relates to a method for activating a secondary battery. The present invention comprises: a primary charging step of charging a secondary battery including a positive electrode, a negative electrode, a separator, and an electrolyte; a room temperature-aging step of storing, at a room temperature, the secondary battery that has undergone the primary charging step; and a high temperature-aging step of storing, at a high temperature, the secondary battery that has undergone the room temperature-aging step, wherein charging/discharging is performed by alternately applying + current and − current to the secondary battery at the end of the primary charging step. The method for activating a secondary battery according to the present invention includes alternately applying + current and − current to the secondary battery at the end of the primary charging step to stabilize an SEI film, thereby shortening a following-up aging time.

13 Claims, 3 Drawing Sheets

(56) References Cited

U.S. PATENT DOCUMENTS

| | | | | |
|---|---|---|---|---|
| 2003/0104272 A1* | 6/2003 | Yamaguchi | ......... | H01M 10/058 429/231.95 |
| 2010/0068576 A1 | 3/2010 | Hamada et al. | | |
| 2010/0068578 A1* | 3/2010 | Katano | ............ | H01M 8/04089 429/437 |
| 2012/0141869 A1* | 6/2012 | Takahata | ............... | H01M 10/44 429/188 |
| 2016/0261006 A1 | 9/2016 | Ueno et al. | | |
| 2016/0261008 A1* | 9/2016 | Stefani | .................. | H01M 10/39 |
| 2016/0268648 A1* | 9/2016 | Ueno | .................... | H01M 4/043 |

FOREIGN PATENT DOCUMENTS

| | | |
|---|---|---|
| CN | 106785052 A | 5/2017 |
| CN | 106058326 A | 11/2023 |
| JP | 2005-243245 A | 9/2005 |
| JP | 2005-251396 A | 9/2005 |
| JP | 2005-251614 A | 9/2005 |
| JP | 2005-340022 A | 12/2005 |
| JP | 2008-258120 A | 10/2008 |
| JP | 4835599 B2 | 2/2011 |
| JP | 2012-227035 A | 11/2012 |
| JP | 2015-95334 A | 5/2015 |
| JP | 2015-228289 A | 12/2015 |
| JP | 2016-21301 A | 2/2016 |
| KR | 10-1999-0055237 A | 7/1999 |
| KR | 2000-0020534 A | 4/2000 |
| KR | 2000-0042002 A | 7/2000 |
| KR | 10-2003-0047655 A | 6/2003 |
| KR | 10-2004-0110331 A | 12/2004 |
| KR | 10-2014-0139357 A | 12/2014 |
| KR | 10-2015-0015303 A | 2/2015 |
| KR | 10-2015-0015417 A | 2/2015 |
| KR | 10-2015-0049479 A | 5/2015 |
| KR | 10-1609423 B1 | 4/2016 |
| KR | 10-2017-0103700 A | 9/2017 |
| KR | 10-2018-0082759 A | 7/2018 |

OTHER PUBLICATIONS

Wang et al., "Forward and reverse differential pulse effects applied in the formation of a solid electrolyte interface to enhance the performance of lithium batteries," Electrochimica Acta, vol. 147, 2014 (Available online Oct. 7, 2014), pp. 582-588.

Extended European Search Raport, dated Jul. 16, 2021, for European Application No. 19887720.1.

International Search Report (PCT/ISA/210) issued in PCT/KR2019/015680, dated Mar. 2, 2020.

Chinese Office Action and Search Report for corresponding Chinese Application No. 201980034560.X, dated Aug. 24, 2023, with partial English translation.

* cited by examiner

[FIG. 1]

CONVENTIONAL ART

METHOD FOR ACTIVATING SECONDARY BATTERY

TECHNICAL FIELD

This application claims the benefit of priority based on Korean Patent Application No. 10-2018-0143603, filed on Nov. 20, 2018, and the entire contents of the Korean patent application are incorporated herein by reference.

The present invention relates to a method for activating a secondary battery, in which the aging period is shortened through a charging and discharging operation in which + and − currents are alternately applied at the end of a primary charging process.

BACKGROUND ART

As technology development and demand for mobile devices increase, the demand for secondary batteries as an energy source is rapidly increasing, and among these secondary batteries, lithium secondary batteries having high energy density and voltage have been commercialized and widely used.

The secondary battery is composed of a positive electrode, a negative electrode, a separator and an electrolyte. Specifically, the positive electrode is formed of a current collector coated with a positive electrode active material layer, and the negative electrode is formed of a current collector coated with a negative electrode active material layer. Specifically, the positive electrode is produced by applying a positive electrode mixture including a positive electrode active material, a conductive material and a binder to the positive electrode current collector, drying it, rolling it as necessary, and cutting it into a predetermined shape. Further, the negative electrode is produced by applying a negative electrode mixture including a negative electrode active material, a conductive material and a binder to the negative electrode current collector, drying it, rolling it as necessary, and cutting it into a predetermined shape. The positive electrode mixture and the negative electrode mixture are in a paste form containing a dispersion medium, and are applied to one or both sides of each current collector.

An electrode assembly is manufactured by preparing a positive electrode/separator/negative electrode structure by inserting a separator into a space between the positive electrode and the negative electrode. Such an electrode assembly may be divided into a jelly-roll type which is wound after interposing a separator between a positive electrode and a negative electrode of a long sheet type coated with an active material, and a stack type which is sequentially stacked in a state that a separator is interposed between a number of positive and negative electrodes of a predetermined size.

The electrode assembly as described above is inserted into a battery case, and an electrolyte is introduced and sealed to manufacture a secondary battery. The secondary battery may be divided into a cylindrical battery and a rectangular battery in which the electrode assembly is embedded in a cylindrical or square metal can, and a pouch-type battery in which the electrode assembly is embedded in a pouch-shaped case of an aluminum laminate sheet, depending on the shape of the battery case.

In general, after the secondary battery is manufactured as described above, an activation process is performed. Through the activation process, the battery structure is stabilized and becomes usable. The activation process varies depending on the capacity of the secondary battery, the type and electrical properties of the electrode material, the type and chemical properties of the electrolyte, etc., but basically, when the electrolyte is sufficiently wetted to the electrode material, the primary or initial charge is performed. Thereafter, aging, discharge, degassing, etc. may be performed.

Among the activation processes, the primary charging is to stabilize the structure of the electrode by forming a solid electrolyte interface (hereinafter, referred to as "SEI film") on an electrode (specifically, a negative electrode). The SEI film serves to transfer lithium ions at the electrode-electrolyte interface, and helps to move lithium ions under uniform current distribution by alleviating overvoltage and securing uniform particle size and chemical composition. Hence, in order to be able to use a secondary battery for a long time, it is necessary to physically and chemically stabilize the SEI film.

After the first filling process, an aging process is performed. The aging process is a process of aging the secondary battery for a certain period of time at a specified temperature and humidity, in which by aging the secondary battery at room temperature and/or high temperature, the electrolyte inside the secondary battery is sufficiently impregnated in the electrode material to thereby optimize the movement of lithium ions.

However, the aging process of the secondary battery as described above has a problem that the battery production process becomes longer as the aging process takes a lot of time, and there is a need to develop a technology capable of shortening the time of the aging process.

DISCLOSURE

Technical Problem

It is an object of the present invention to solve the above-mentioned problems of the prior art and the technical problems required from the past.

The inventors of the present application have found that it is possible to stabilize the SEI film in a short time by alternately applying + and − currents to end of the primary charging after in-depth studies and various experiments. Accordingly, the present invention has been completed through the effect of reducing the aging time of the secondary battery as a whole.

Therefore, an object of the present invention is to provide a method for activating a secondary battery in which the SEI film is stabilized within a short time, and the overall aging time is shortened, and a secondary battery prepared therefrom.

Technical Solution

In order to achieve the above object, according to an embodiment of the present invention, there is provided an activation method including: a primary charging step of charging a secondary battery including a positive electrode, a negative electrode, a separator and an electrolyte; a room temperature aging step of storing a secondary battery having gone through the primary charging step at a room temperature; and a high temperature aging step of storing the secondary battery having gone through the room temperature aging step at a high temperature, wherein at the end of the primary charging step, charging and discharging are performed by alternately applying + current and − current to the battery.

The room temperature aging step according to an embodiment of the present invention may be performed for 6 hours or less, preferably 2 to 4 hours.

Further, a charging voltage in the primary charging step may be 3.0 to 4.0 V, C-rate may be 0.1 to 3.0 C, and changing may be performed at 20 to 40% of a state of charge (SOC) of the secondary battery. At this time, the charging time of the primary charging step may be 30 to 120 minutes.

Charging and discharging performed at an end of the primary charging step according to the present invention may be performed within 3 to 10% of the SOC, C-rate of charging and discharging performed at the end of the primary charging step may be 0.1 to 2.0 C, and the number of times of charging and discharging performed at the end of the primary charging step may be 1 to 5.

Further, the high temperature aging step may be performed at 40 to 80° C. for 12 to 36 hours.

A secondary charging step may be further included after the high temperature aging step. At this time, a charging voltage in the secondary charging step may be 3.8 to 4.6 V, a charging current may be 0.1 to 1.0 C, and changing may be performed at 40 to 90% of a state of charge (SOC) of the secondary battery.

Further, a degassing step may be further included after the secondary charging step.

In another embodiment of the present invention, there is provided a secondary battery manufactured by performing an activation method.

Advantageous Effects

The method of activating the secondary battery according to the present invention exerts an effect of stabilizing the SEI film and shortening the subsequent aging time by alternately applying + and − currents at the end of the primary initial charge.

In addition, as a result of the aging time being shortened due to the rapid and stable formation of the SEI film, the overall activation process time is saved and productivity is increased.

In addition, even if the aging time is shortened, a secondary battery having a performance equivalent to that of a capacity and resistance performance of a secondary battery manufactured by a conventional activation process can be provided.

DETAILED DESCRIPTION OF THE PREFERRED EMBODIMENTS

Hereinafter, the present invention will be described in detail.

The terms and words used in the present specification and claims should not be construed as limited to ordinary or dictionary terms and the inventor may properly define the concept of the terms in order to best describe its invention. The terms and words should be construed as meaning and concept consistent with the technical idea of the present invention.

The present invention provides a method of activating a secondary battery capable of shortening the aging time as the SEI film in the negative electrode surface is stably formed by applying reverse and forward currents after primary charging.

The activation method according to an embodiment of the present invention includes: a primary charging step of charging a secondary battery including a positive electrode, a negative electrode, a separator and an electrolyte; a room temperature aging step of storing a secondary battery having gone through the primary charging step at a room temperature; and a high temperature aging step of storing the secondary battery having gone through the room temperature aging step at a high temperature, wherein at the end of the primary charging step, charging and discharging are performed by alternately applying + current and − current to the battery.

The "alternately applying + current and − current" may be understood as having the same meaning as repeating charging/discharging.

Generally in the secondary battery, after receiving the electrode assembly in the battery case and injecting the electrolyte, an activation process is performed to stabilize the battery structure and make it usable. The activation process goes through processes such as pre-aging, charging, aging, and discharging, and the degree of activation affects various characteristics such as performance, life, and safety of the battery.

Primary charging or initial charging for activation of the battery causes an SEI film to be formed on the negative electrode surface at around 3.0V to 4.0V, and this process facilitates the movement of lithium ions at the electrolyte-electrode interface and suppresses the decomposition of the electrolyte.

In the related art, it has been common to set an SOC in a predetermined range and perform an aging process at room temperature or high temperature when reaching the SOC set during primary or initial charging. However, In the present invention, in order to shorten the aging time after the primary charging, a uniform SEI film is formed through a charging and discharging process that alternately applies + current and − current at the end of the primary charging step, that is, alternately applies reverse and forward currents.

The SEI film formed through the general primary charging step has a non-uniform and rough surface as if a floor and valleys were formed. In the SEI film having a rough surface, lithium ions are repeatedly charged and discharged during battery use to thereby form a continuous SEI film, resulting in a decrease in battery capacity.

Accordingly, in the present invention, a uniform SEI film is formed through a charging/discharging process in which + current and − current are alternately applied at the end of the primary charging, that is, the reverse current and the forward current are alternately applied.

Figure 3:
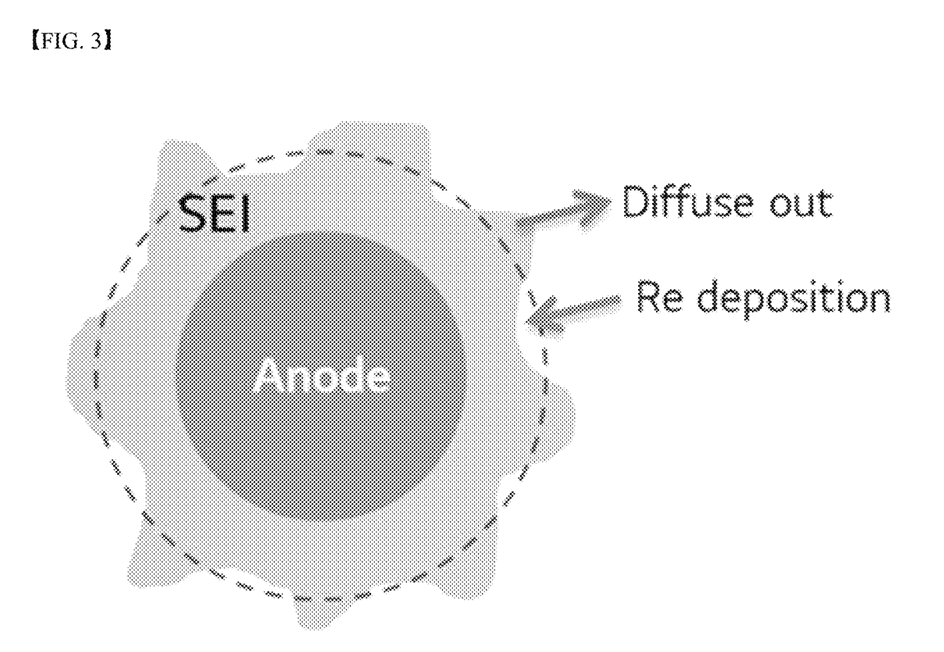
FIG. 3 is a schematic diagram showing a stabilization principle of a SEI film according to an embodiment of the present invention.

Referring to FIG. 3, the present invention is based on the principle that the peak portion of the SEI film is melted in the electrolyte during charging by applying a reverse current, and the surface of the film is uniformly formed by redeposition of the valley portion of the film during discharge by applying a forward current.

Since the SEI film can be uniformly and smoothly formed by repeating charging and discharging several times at the end of the primary charging step, the SEI film on the negative electrode surface is stabilized within a short period of time, and further, the aging time after the primary charging is shortened.

Charging and discharging performed at the end of the primary charging step according to the present invention is preferably performed at SOC 3 to 10%, preferably 3 to 9%, and more preferably 3 to 7%. When the SOC section is less than 3%, there is a possibility that SEI stabilization may not be sufficiently achieved, and when the SOC section becomes too long exceeding 10%, the film becomes thick and the time required for charging and discharging increases.

In addition, the C-rate of the charge and discharge performed at the end of the primary charging step according to the present invention may be carried out at 0.1 to 2.0 C, preferably 0.5 to 1.0 C, more preferably 0.7 C. If the C-rate is less than 0.1 C, there is a problem that the time required for charging and discharging is increased. If the C-rate is more than 2.0 C, the film is unevenly generated, which is not preferable.

In addition, the number of times of charge and discharge performed at the end of the primary charging step according to the present invention is 1 to 5, preferably 2 to 4 times, more preferably 3 times. At this time, if the number of times of current application exceeds 5, the time required for charging and discharging increases and the SEI film becomes thicker than necessary, and if the number of times is too small, stabilization of the SEI film is not sufficient, which is not preferable.

By performing charging and discharging at the end of the primary charging step as described above, the formation of a stable and robust SEI film becomes possible, the stabilization period of the film is shortened, and the stabilized film shortens the aging time afterwards. As a result, the period of the overall activation process is shortened, thereby exhibiting excellent effects in terms of productivity.

In the present invention, the primary charging step may be performed by a constant current-constant voltage (CC/CV) charging scheme. The constant current-constant voltage charging refers to a method of charging with a constant voltage when charging is performed at a constant current and reaches a certain voltage close to a full charge potential.

The charging voltage in the primary charging step of the present invention may be 3.0 to 4.0V, C-rate may be 0.1 to 3.0 C, and changing is preferably performed at 20 to 40% of the secondary battery capacity. When the C-rate is less than 0.1 C, the charging time increases to increase the total time required for the activation process. On the contrary, when the C-rate exceeds 3.0 C, the battery is charged at a high rate and an overload may occur due to the overloading to the battery, and it is difficult to form a uniform SEI film.

In addition, when the charging voltage is less than 3.0V or when the secondary battery capacity is less than 20%, there is a problem that an SEI film is not formed. On the other hand, when the charging voltage exceeds 4.0V or the charging SOC exceeds 40%, there is a possibility of lithium precipitation, so an additional process such as pressurization is required to prevent this, so SOC of 40% or less is preferable.

Thereafter, a room temperature aging step of storing the battery at room temperature is performed.

Through the aging step at room temperature, the SEI film is more stabilized and formed to have a uniform thickness. That is, it is generally stabilized by leaving it at room temperature for a period of time. Room temperature aging improves the electrode impregnation of the battery electrolyte and thereby secures the capacity reliability of the battery.

Conventionally, the time required for the room temperature aging step is generally about 24 hours, but in the present invention, the time required for room temperature aging may be greatly reduced to 6 hours, or 2 to 4 hours. This can be understood that the stabilization period of the SEI film in the aging step is shortened by the operation of pre-stabilizing the SEI film through the charging and discharging process at the end of the primary charging process of the present invention.

Figure 1:
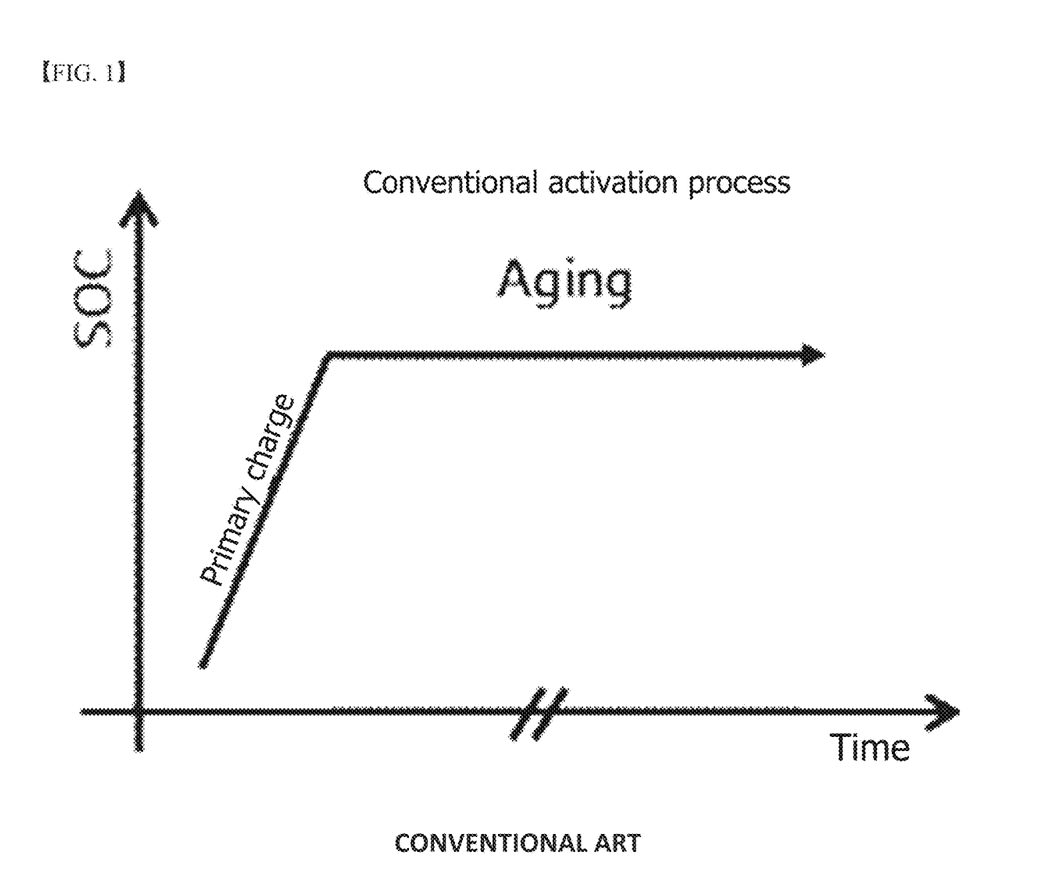
FIG. 1 is a graph showing the time required for a first charge and an aging process according to a conventional activation method.
Figure 2:
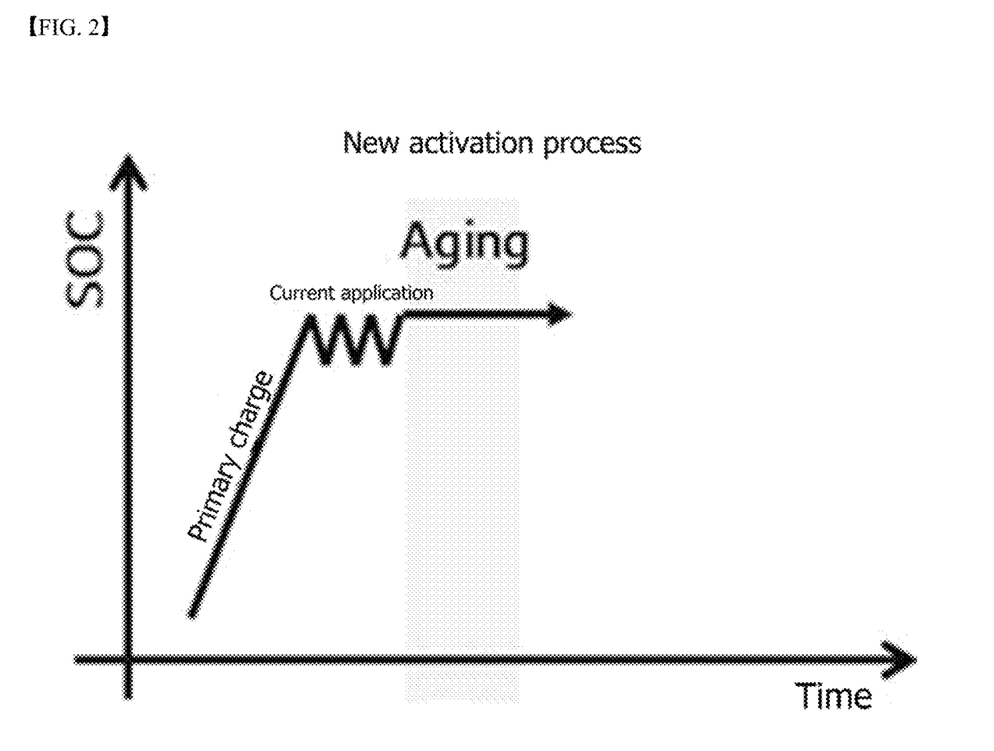
FIG. 2 is a graph showing the time required for a primary charge and aging process in an activation method of a secondary battery according to an embodiment.

In this regard, in FIG. 1 and FIG. 2, the vertical axis indicates the storage remaining capacity (SOC), and the horizontal axis indicates the required time. In FIG. 1, which corresponds to the prior art, the time required for the aging step after the first charging step is long, but in FIG. 2 corresponding to the present invention, it can be seen that the aging time is shortened because the charging and discharging process according to the current is applied at the end of the primary charging to stably form the SEI film.

Thereafter, a high temperature aging step of storing the battery, which has gone through the room temperature aging step, at a high temperature may be performed. The high temperature aging step is also a process in which the SEI film is further stabilized and uniformly formed by thermal energy and electrochemical energy. The high temperature aging step may be performed at 40 to 80° C. for 12 to 36 hours. If the temperature is less than 40° C., further stabilization of the SEI film does not proceed easily. If the temperature exceeds 80° C., the exterior material may rupture due to evaporation of the electrolyte, or the battery may be ignited, resulting in a decrease in battery capacity and lifespan.

The activation method of a secondary battery according to an embodiment of the present invention may further include a secondary charging step after the high temperature aging step. At the secondary charging step, the charging voltage may be 3.8 to 4.6 V, C-rate may be 0.1 to 1.0 C, and the step may preferably be carried out at 40 to 90% of the secondary battery capacity. When the charging voltage is less than 3.8V or the C-rate is less than 0.1 C, battery manufacturing productivity decreases, and when the charging voltage is 4.6V or the C-rate is more than 1.0 C, battery performance decreases.

In addition, the secondary battery activation method according to an embodiment of the present invention may further include a degassing step after the secondary charging step. This is to remove the side reaction gas generated inside the battery through the aging step, and it is possible to remove the side reaction gas generated inside the secondary battery through the degassing step. The gas generated in the aging step may cause a swelling phenomenon of the battery, so that the gas may be removed through a degassing process. The degassing process may be performed by opening the sealing of the battery case or by providing a separate gas removing tool. If the degassing is performed by opening the battery case, the opened part may be resealed.

In addition, the present invention provides a secondary battery produced by the above activation method. The lithium secondary battery may be a lithium ion battery, may be a lithium polymer battery, or may be a lithium ion polymer battery.

The secondary battery usable in the present invention is not particularly limited, and may be preferably a lithium secondary battery composed of a positive electrode, a negative electrode, a separator, and a lithium salt-containing non-aqueous electrolyte.

Specifically, it may be a secondary battery in which an electrode assembly is embedded in the battery case, in which the electrode assembly includes two or more unit electrodes including a positive electrode and a negative electrode and are wound in a state that a separator is interposed between the unit electrodes. The secondary battery may be a cylindrical, square or pouch type secondary battery.

The unit electrode may be manufactured by applying an electrode mixture containing an electrode active material on a current collector and then drying the electrode mixture. The electrode mixture may further include a binder, a conductive material, a filler, and the like, as necessary.

Both weak magnetic and nonmagnetic metal ultrathins may be used as the current collector. The positive electrode collector generally has a thickness of 3 to 500 micrometers. The positive electrode current collector is not particularly limited as long as it has high conductivity without causing a chemical change in the battery. Examples of the positive electrode current collector include stainless steel, aluminum, nickel, titanium, or aluminum or stainless steel of which the surface has been treated with carbon, nickel, titanium, silver, or the like. The current collector may have fine irregularities on the surface thereof to increase the adhesion of the positive electrode active material, and various forms such as a sheet, a foil, and a net are possible.

The negative electrode collector generally has a thickness of 3 to 500 micrometers. The negative electrode current collector is not particularly limited as long as it has electrical conductivity without causing chemical changes in the battery, and examples thereof include copper, stainless steel, aluminum, nickel, titanium, sintered carbon, copper or stainless steel of which the surface has been treated with carbon, nickel, titanium, silver or the like, aluminum-cadmium alloy, or the like. In addition, like the positive electrode current collector, fine unevenness can be formed on the surface to enhance the bonding force of the negative electrode active material, and it can be used in various forms such as a sheet, a foil, and a net.

The positive electrode active material is a material capable of causing an electrochemical reaction and a lithium transition metal oxide, and contains two or more transition metals. Examples thereof include: layered compounds such as lithium cobalt oxide ($LiCoO_2$) and lithium nickel oxide ($LiNiO_2$) substituted with one or more transition metals; lithium manganese oxide substituted with one or more transition metals; lithium nickel oxide represented by the formula $LiNi_{1-y}M_yO_2$ (wherein M=Co, Mn, Al, Cu, Fe, Mg, B, Cr, Zn or Ga and contains at least one of the above elements, $0.01 \leq y \leq 0.7$); lithium nickel cobalt manganese composite oxide represented by the formula $Li_{1+z}Ni_bMn_cCo_{1-(b+c+d)}M_dO_{(2-e)}A_e$ such as $Li_{1+z}Ni_{1/3}Co_{1/3}Mn_{1/3}O_2$, $Li_{1+z}Ni_{0.4}Mn_{0.4}Co_{0.2}O_2$ etc. (wherein $-0.5 \leq z \leq 0.5$, $0.1 \leq b \leq 0.8$, $0.1 \leq c \leq 0.8$, $0 \leq d \leq 0.2$, $0 \leq e \leq 0.2$, b+c+d<1, M=Al, Mg, Cr, Ti, Si or Y, and A=F, P or Cl); olivine-based lithium metal phosphate represented by the formula $Li_{1+x}M_{1-y}M'_yPO_{4-z}X_z$ (wherein M=transition metal, preferably Fe, Mn, Co or Ni, M'=Al, Mg or Ti, X=F, S or N, and $-0.5 \leq x \leq 0.5$, $0 \leq y \leq 0.5$, $0 \leq z \leq 0.1$).

As the negative electrode active material, for example, carbon such as non-graphitized carbon, graphite carbon, carbon black, acetylene black, ketjen black, channel black, furnace black, lamp black, summer black, graphene, or graphite; metal complex oxide of $Li_xFe_2O_3$ ($0 \leq x \leq 1$), $Li_xWO_2$ ($0 \leq x \leq 1$), $Sn_xMe_{1-x}Me'_yOz$ (Me: Mn, Fe, Pb, Ge; Me': Al, B, P, Si, group 1, 2, and 3 elements of the periodic table, halogen; $0 \leq x \leq 1$; $1 \leq y \leq 3$; $1 \leq z \leq 8$); lithium metal; lithium alloy; silicon-based alloy; tin alloy; metal oxide such as SnO, $SnO_2$, PbO, $PbO_2$, $Pb_2O_3$, $Pb_3O_4$, $Sb_2O_3$, $Sb_2O_4$, $Sb_2O_5$, GeO, $GeO_2$, $Bi_2O_3$, $Bi_2O_4$, or $Bi_2O_5$; conductive polymer such as polyacetylene; Li—Co—Ni-based material, etc. may be used.

The conductive material is usually added in an amount of 1 to 30% by weight based on the total weight of the mixture including the positive electrode active material. Such a conductive material is not particularly limited as long as it has electrical conductivity without causing a chemical change in the battery, and examples thereof include graphite such as natural graphite and artificial graphite; carbon black such as carbon black, acetylene black, Ketjen black, channel black, furnace black, lamp black, and summer black; conductive fibers such as carbon fiber and metal fiber; metal powders such as carbon fluoride, aluminum and nickel powder; conductive whiskey such as zinc oxide and potassium titanate; conductive metal oxides such as titanium oxide; and conductive materials such as polyphenylene derivatives and the like.

The binder is added in an amount of 1 to 30% by weight, on the basis of the total weight of the mixture containing the positive electrode active material, as a component that assists in bonding between the active material and the conductive material and bonding to the current collector. Examples of such binders include polyvinylidene fluoride, polyvinyl alcohol, carboxymethylcellulose (CMC), starch, hydroxypropylcellulose, regenerated cellulose, polyvinylpyrrolidone, tetrafluoroethylene, polyethylene, polypropylene, ethylene-propylene-diene terpolymer (EPDM), sulfonated EPDM, styrene butylene rubber, fluorine rubber, various copolymers and the like.

The filler is optionally used as a component for inhibiting expansion of an electrode, and is not particularly limited as long as it is a fibrous material without causing a chemical change in the battery. Examples of the filler include olefin polymers such as polyethylene and polypropylene; fibrous materials such as glass fibers and carbon fibers.

Other components, such as viscosity modifiers, adhesion promoters, and the like may be further included optionally or in combination of two or more. The viscosity modifier is a component that adjusts the viscosity of the electrode mixture so that the mixing process of the electrode mixture and the coating process on the current collector thereof may be easy, and may be added up to 30% by weight based on the total weight of the negative electrode mixture. Examples of such a viscosity modifier include carboxy methyl cellulose, polyvinylidene fluoride, and the like, but are not limited thereto. In some cases, the solvent described above may serve as a viscosity modifier.

The adhesion promoter is an auxiliary component added to improve the adhesion of the active material to the current collector and may be added in less than 10% by weight compared to the binder, and some examples thereof include oxalic acid, adipic acid, formic acid, acrylic acid derivatives, itaconic acid derivatives, and the like.

The separator is interposed between the positive electrode and the negative electrode, and an insulating thin film having high ion permeability and mechanical strength is used. The pore diameter of the separator is generally 0.01 to 10 micrometers, and the thickness is generally 5 to 300 micrometers. Examples of such a separator include olefin-based polymers such as polypropylene which is chemically resistant and hydrophobic; a sheet or a nonwoven fabric made of glass fiber, polyethylene or the like. When a solid electrolyte such as a polymer is used as the electrolyte, the solid electrolyte may also serve as a separator.

The lithium salt-containing non-aqueous electrolyte consists of an electrolyte and a lithium salt. And a non-aqueous organic solvent, an organic solid electrolyte, an inorganic solid electrolyte, and the like are used as the electrolyte solution.

Examples of the non-aqueous organic solvent include N-methyl-2-pyrrolidinone, propylene carbonate, ethylene carbonate, butylenecarbonate, dimethyl carbonate, diethyl carbonate, gamma-Butyrolactone, 1,2-dimethoxyethane, tetrahydroxyfuran, 2-methyltetrahydrofuran, dimethylsulfoxide, 1,3-dioxolane, formamide, dimethylformamide, dioxolane, acetonitrile, nitromethane, methyl formate, methyl acetate, phosphoric acid triester, trimethoxymethane, dioxolane derivatives, sulfolane, methyl sulfolane, 1,3-dimethyl-2-imidazolidinone, propylene carbonate derivatives, tetrahydrofuran derivatives, ethers, methyl pyrophosphate, ethyl propionate, etc.

Examples of the organic solid electrolyte include a polymer electrolyte such as a polyethylene derivative, a polyethylene oxide derivative, a polypropylene oxide derivative, a phosphate ester polymer, an agitation lysine, a polyester sulfide, a polyvinyl alcohol, a polyvinylidene fluoride, a polymerizer including an ionic dissociation group, and the like.

Examples of the inorganic solid electrolyte include nitrides, halides, and sulfates of Li such as $Li_3N$, $LiI$, $Li_5NI_2$, $Li_3N$—$LiI$—$LiOH$, $LiSiO_4$, $LiSiO_4$—$LiI$—$LiOH$, $Li_2SiS_3$, $Li_4SiO_4$, $Li_4SiO_4$—$LiI$—$LiOH$, and $Li_3PO_4$—$Li_2S$—$SiS_2$.

The lithium salt is a substance that is soluble in the non-aqueous electrolyte. The examples of the lithium salt include LiCl, LiBr, LiI, $LiClO_4$, $LiBF_4$, $LiB_{10}Cl_{10}$, $LiPF_6$, $LiCF_3SO_3$, $LiCF_3CO_2$, $LiAsF_6$, $LiSbF_6$, $LiAlCl_4$, $CH_3SO_3Li$, $(CF_3SO_2)_2NLi$, chloroborane lithium, lower aliphatic carboxylic acid lithium, lithium 4-phenylborate, imide and the like.

For the purpose of improving charge/discharge characteristics, flame retardancy, etc., pyridine, triethylphosphite, triethanolamine, cyclic ether, ethylenediamine, n-glyme, hexaphosphoric triamide, nitrobenzene derivative, sulfur, quinone imine dye, N-substituted oxazolidinone, N-substituted imidazolidine, ethylene glycol dialkyl ether, ammonium salt, pyrrole, 2-methoxyethanol, aluminum trichloride, etc. may be added to the electrolyte. In some cases, a halogen-containing solvent such as carbon tetrachloride or ethylene trifluoride may be further added to impart nonflammability, or a carbon dioxide gas may be further added to improve the high-temperature storage characteristics, and FEC (Fluoro-EthyleneCarbonate), PRS (Propene sultone), and the like may be further added.

In one preferred example, a lithium salt such as $LiPF_6$, $LiClO_4$, $LiBF_4$, and $LiN(SO_2CF_3)_2$ may be added to a mixed solvent of a cyclic carbonate of EC or PC which is a high-dielectric solvent and a linear carbonate of DEC, DMC or EMC which is low viscosity solvent to thereby prepare a non-aqueous electrolyte containing a lithium salt.

According to a secondary battery according to an embodiment of the present invention, since a SEI film may be stably formed on the negative electrode surface, the aging process can be drastically reduced, which not only the productivity increases, but also even when the aging period is shortened, the capacity and resistance of the battery may be equal to or superior to that of the prior art.

According to the present invention, a battery pack, a device and the like including the secondary battery as a unit battery may be provided. Specifically, the device may be selected from the group consisting of a mobile phone, a portable computer, a smart phone, a smart pad, a netbook, an electric vehicle, a hybrid electric vehicle, a plug-in hybrid electric vehicle, and a power storage device.

Hereinafter, the present invention will be described in detail with reference to examples. However, the embodiments according to the present invention may be modified into various other forms, and the scope of the present invention should not be construed as being limited to the embodiments described below. The embodiments of the present invention are provided to more fully describe the present invention to those skilled in the art.

Example 1

(Preparation of Positive Electrode)

$Li(Li_{0.2}Ni_{0.2}Mn_{0.6})O_2$: Super-P (Timcal, Inc.): PVdF (Solef, Inc. 6020) of mass ratio 95:2.5:2.5 was mixed to prepare a slurry, and then a positive electrode was prepared by uniformly applying the slurry on both sides of an aluminum thin plate having a thickness of 15 μm and then rolling it.

(Preparation of Negative Electrode)

Natural graphite: Super-P (Timcal, Inc.): PVdF (Solef, Inc. 6020) of mass ratio 95:2.5:2.5 was mixed with NMP solvent to prepare a negative electrode slurry. Thereafter, the negative electrode slurry was uniformly applied to both sides of a copper having a thickness of 10 μm to thereby prepare a negative electrode.

(Electrolyte Preparation)

An electrolyte was prepared by dissolving 1 mol of $LiPF_6$ in a solution having a volume ratio of 1:2 of ethylene carbonate (EC) and dimethyl carbonate (DMC).

(Battery Preparation)

A separator was interposed between the positive electrode and the negative electrode manufactured by the above-described method, and it was inserted into a pouch-type battery case, then the prepared electrolyte was injected. After the injection, it was stored in a 25° C. chamber for about 3 days, and then charging was performed to become 30% of the state of charge (SOC) to thereby complete the primary charge. At this time, charging and discharging was performed three times at a rate of C-rate of 0.7 C in a 5% SOC range at the primary charging end. Thereafter, a room temperature aging process was performed at 25° C. for 3 hours, and then a high temperature aging process was further performed at 60° C. for one day. Thereafter, a degassing process was performed to thereby complete production of a final battery.

Example 2

A battery was prepared in the same manner as in Example 1 except that the number of times of charge and discharge performed was changed to one at the end of the primary charge process.

Example 3

A battery was prepared in the same manner as in Example 1 except that the number of times of charge and discharge performed was changed to 5 at the end of the primary charge process.

Example 4

A battery was prepared in the same manner as in Example 1 except that C-rate was changed to 0.5 C at the end of the primary charge process.

Example 5

A battery was prepared in the same manner as in Example 1 except that the range of charge and discharge performed was changed to a range within SOC 3% at the end of the primary charge process.

Example 6

A battery was prepared in the same manner as in Example 1 except that the range of charge and discharge performed was changed to a range within SOC 7% at the end of the primary charge process.

Example 7

A battery was prepared in the same manner as in Example 1 except that the range of charge and discharge performed was changed to a range within SOC 10% at the end of the primary charge process.

Example 8

A battery was prepared in the same manner as in Example 1 except that C-rate was changed to 1.2 C at the end of the primary charge process.

Comparative Example 1

A battery was manufactured in the same manner as in Example 1, except that charging and discharging were not performed at end of the primary charging, and the aging time was changed to 48 hours.

Comparative Example 2

A battery was manufactured in the same manner as in Example 1, except that charging and discharging was not performed at the end of the primary charging.

Comparative Example 3

A battery was prepared in the same manner as in Example 1 except that the range of charge and discharge performed was changed to a range within SOC 15% at the end of the primary charging.

Comparative Example 4

A battery was prepared in the same manner as in Example 1 except that C-rate was changed to 2.1 C at the end of the primary charging.

<Experimental Example 1> Capacity Measurement

For each of the batteries manufactured through Examples 1 to 8 and Comparative Examples 1 to 4, discharge was performed at 0.33 C from 4.2 V to 2.5 V, and the discharge capacity was measured, and the results are shown in Table 1.

<Experimental Example 2> Resistance Measurement

The cells prepared through Examples 1 to 8 and Comparative Examples 1 to 4 were discharged for 10 seconds at a C-rate of 2 C at 50% SOC, and the results are shown in Table 1.

TABLE 1

| Division | Charge/discharge conditions at the end of primary charging | | | Room temperature aging time (Hour) | Capacity (Ah) | Resistance (mOhm) |
|---|---|---|---|---|---|---|
| | Number of times | Speed (C-rate) | SOC range | | | |
| Example 1 | 3 | 0.7 C | 5% | 3 | 64.47 | 1.550 |
| Example 2 | 1 | 0.7 C | 5% | 3 | 64.45 | 1.562 |
| Example 3 | 5 | 0.7 C | 5% | 3 | 64.47 | 1.556 |
| Example 4 | 3 | 0.5 C | 5% | 3 | 64.47 | 1.549 |
| Example 5 | 3 | 0.7 C | 3% | 3 | 64.45 | 1.558 |
| Example 6 | 3 | 0.7 C | 7% | 3 | 64.47 | 1.553 |
| Example 7 | 3 | 0.7 C | 10% | 3 | 64.45 | 1.561 |
| Example 8 | 3 | 1.2 C | 5% | 3 | 64.44 | 1.565 |
| Comparative Example 1 | — | — | — | 48 | 64.45 | 1.545 |
| Comparative Example 2 | — | — | — | 3 | 64.41 | 1.585 |
| Comparative Example 3 | 3 | 0.7 C | 15% | 3 | 64.44 | 1.570 |
| Comparative Example 4 | 3 | 2.1 C | 5% | 3 | 64.44 | 1.572 |

First, the battery of Comparative Example 1, which was subjected to aging at room temperature for 48 hours after primary charging, was compared with the battery of Comparative Example 2, which was subjected to aging at room temperature for 3 hours after primary charging. Herein, in the battery of Comparative Example 2, the room temperature aging time was insufficient, and the SEI film was not stabilized, resulting in high resistance and slightly lower capacity.

The batteries of Examples 1 to 8 according to the activation method of the present invention have a very short aging time at room temperature of 3 hours as in Comparative Example 2, but since the SEI film was stabilized by repeating charging and discharging several times at the end of the primary charging process, it was found that the resistance performance was much better than Comparative Example 2.

In particular, at the end of the first initial charge, in the case of batteries of Examples (examples 1, 3, 4 and 6), which are manufactured by repeatedly charging and discharging under the condition that the number of times of charge and discharge times is 3 to 5, the C-rate is 0.5 C to 0.7 C, and the SOC range is 3% to 7%, it was confirmed that it has the same level of resistance performance, compared to the battery of Comparative Example 1 prepared by sufficiently aging at room temperature.

On the other hand, charge and discharge were performed several times at the end of the primary charging process, but the resistance performance of Comparative Example 3 in which the SOC range of charge and discharge was 15% and Comparative Example 4 in which C-rate was 2.1 C was superior to the resistance performance of Comparative Example 2. However, it was found that it was much higher than the resistance value of Comparative Example 1. As such, in the present invention, when repeating charging and discharging at the end of the primary charging process, it is considered that the SOC range is preferably less than 15%, and the C-rate is preferably less than 2.1 C.

In the activating process of the secondary battery as described above, by repeating charging and discharging at the end of the primary initial charge, the activation method of the present invention for stabilizing the SEI film has an effect of shortening the aging time after the primary initial charge. In addition, the capacity and resistance performance of the same level are imparted as compared to a battery sufficiently subjected to aging at room temperature according to the conventional activation method.

In the above, the present invention has been described in detail with reference to the described examples, but it is natural that a person having ordinary knowledge in the technical field to which the present invention pertains is capable of performing various substitutions, additions, and modifications without departing from the technical spirit described above, and it should be understood that these modified embodiments also belong to the protection scope of the present invention as defined by the appended claims.

The invention claimed is:

1. A method for activating a secondary battery, the method comprising:
    (i) a primary charging step comprising charging a secondary battery including a positive electrode, a negative electrode, a separator and an electrolyte, and at the end of primary charging, performing charging and discharging by alternately applying reverse and forward currents to the secondary battery;
    (ii) a room temperature aging step of storing the secondary battery after having gone through the primary charging step; and
    (iii) a high temperature aging step of storing the secondary battery after having gone through the room temperature aging step.

2. The method of claim 1, wherein the room temperature aging step is performed for 6 hours or less.

3. The method of claim 2, wherein the room temperature aging step is performed for 2 to 4 hours.

4. The method of claim 1, wherein a charging voltage in the primary charging step is 3.0 to 4.0 V, C-rate is 0.1 to 3.0 C, and changing is performed at 20 to 40% of a state of charge (SOC) of the secondary battery.

5. The method of claim 1, wherein a charging time of the primary charging step is 30 minutes to 120 minutes.

6. The method of claim 1, wherein charging and discharging performed at the end of the primary charging step is performed within 3 to 10% of the SOC.

7. The method of claim 1, wherein C-rate of charging and discharging performed at the end of the primary charging step is 0.1 to 2.0 C.

8. The method of claim 1, wherein a number of times of charging and discharging performed at the end of the primary charging step is 1 to 5.

9. The method of claim 1, wherein the high temperature aging step is performed for 12 to 36 hours at 40 to 80° C.

10. The method of claim 1, further comprising a secondary charging step after the high temperature aging step.

11. The method of claim 10, wherein a charging voltage in the secondary charging step is 3.8 to 4.6 V, a charging current is 0.1 to 1.0 C, and changing is performed at 40 to 90% of a state of charge (SOC) of the secondary battery.

12. The method of claim 10, further comprising a degassing step after the secondary charging step.

13. A secondary battery manufactured by performing the activation method of claim 1.

* * * * *